United States Patent [19]

Fortes

[11] Patent Number: 4,962,902

[45] Date of Patent: Oct. 16, 1990

[54] AIRCRAFT CONTROL SURFACE LINKAGE

[75] Inventor: Rudy F. Fortes, Seattle, Wash.

[73] Assignee: The Boeing Company, Seattle, Wash.

[21] Appl. No.: 326,163

[22] Filed: Mar. 20, 1989

[51] Int. Cl.$^5$ ............................................... B64C 9/02
[52] U.S. Cl. ................................ 244/75 R; 244/90 R; 244/215
[58] Field of Search ................... 16/355, 366, 368, 356; 244/213, 214, 215, 219, 75 R, 90 R, 90 B, 216

[56] References Cited

U.S. PATENT DOCUMENTS

| | | | |
|---|---|---|---|
| 1,019,096 | 3/1912 | Soss | 16/368 |
| 2,352,062 | 6/1944 | Zap | 244/90 R |
| 2,501,726 | 3/1950 | Knox . | |
| 2,853,256 | 9/1958 | Schmidt et al. | 244/90 B |
| 4,053,124 | 10/1977 | Cole . | |
| 4,131,253 | 12/1978 | Zapel | 244/219 |
| 4,247,065 | 1/1981 | Grob et al. | 244/215 |
| 4,446,597 | 5/1984 | Dantzer-Sorensen et al. | 16/368 |
| 4,717,097 | 1/1988 | Sepstrup | 244/90 A |

FOREIGN PATENT DOCUMENTS 2037240A 7/1980 United Kingdom .

Primary Examiner—Galen Barefoot
Attorney, Agent, or Firm—Seed and Berry

[57] ABSTRACT

An improved linkage for the control surfaces, e.g., flaps, of a fighter airplane. The wing of the fighter aircraft includes a thin flap which has inwardly extending portions that extend inwardly of the wing of the aircraft by an amount sufficient to allow angular displacement of the flap without interrupting the continuity of the skin thereof. The linkage includes a radial fork having a first arm, a second arm and an intermediate portion intermediate the first and second arms. The intermediate portion is adapted to be pivotally mouted to the wing of the aircraft. The first arm is arcuately configured so that it does not interfere with the arcuate travel of the thin flap. In a similar manner, the second arm is arcuately configured so that it does not interfere with the movement of the extended portions of the thin flap.

32 Claims, 2 Drawing Sheets

AIRCRAFT CONTROL SURFACE LINKAGE

GOVERNMENT RIGHTS

This invention was made with Government support under Contract No. F33657-87-C-2085, awarded by the United States Air Force. The Government has certain rights in this invention.

TECHNICAL FIELD

The present invention is directed toward linkages for positioning the control surfaces of aircraft and, more particularly, toward an improved linkage mechanism which allows maximum deflection of the control surfaces while restricting mechanisms and parts inside the contour of the airfoil and significantly reducing drag and radar visibility.

BACKGROUND ART

Prior art aircraft have provided various linkage mechanisms for deflecting the flaps of the wings to decrease the stall speed and increase the drag control surfaces for controlling the flight of aircraft. Such aircraft, in their most common configuration, include a pair of asymmetrically deflectable ailerons mounted on the outboard trailing edges of respective wings for controlling the roll of the aircraft, an elevator mounted on the trailing edge of the horizontal stabilizer for controlling the pitch of the aircraft, a rudder mounted on the trailing edge of the vertical stabilizer for controlling the yaw of the aircraft and a pair of symmetrically deflectable flaps mounted on the inboard trailing edges of respective wings for decreasing the stall speed and increasing the drag of the aircraft. However, other control surfaces less commonly used include flaperons which are essentially ailerons that are asymmetrically deflected from either level for a downwardly deflected position, thus combining the functions of flaps and ailerons, and spoilers that are mounted on the wings and symmetrically deflected to reduce the lift of the wings. All of these components, among others, are known as "control surfaces."

The above-described control surfaces are generally designed for thick wings and stabilizers that are typically used in commercial-type aircraft. Further, these mechanisms, and the wings and stabilizers in which they are used, have not been designed to optimize the drag performance of the aircraft or to minimize the radar visibility of the aircraft.

Newer military-type aircraft are presently being designed which include relatively thinner wings and stabilizers that provide much improved maneuverability of the aircraft. Further, these aircraft are being designed with skin material and structure to minimize radar visibility. Accordingly, prior art linkage mechanisms are inadequate for these wings and stabilizers in that they are generally bulky, they require too much space within the wing or stabilizer, they do not provide adequate deflection of the control surfaces, and they are not capable of being used with control surfaces that minimize visibility to radar.

Accordingly, it is desirable to provide an improved linkage mechanism for use with newer military aircraft, which linkage mechanism allows for a thin wing and stabilizer necessary for improved maneuverability, and which has the ability to adequately deflect the control surfaces and which also has outer skin structure necessary to minimize radar visibility of the aircraft.

SUMMARY OF THE INVENTION

It is, therefore, an object of the present invention to provide an improved linkage mechanism for high maneuverability/low radar visibility aircraft.

It is a further object of the present invention to provide an improved linkage structure which maximizes the amount of deflection provided to the control surface of the aircraft wing while restricting the mechanism inside the contour of the airfoil.

It is a still further object of the present invention to provide an improved linkage mechanism which maximizes the deflection provided to the control surface while minimizing the parts count of the mechanism.

It is another object of the present invention to provide an improved linkage mechanism which is structured to cooperate with control surfaces to minimize radar visibility of the aircraft while still allowing maximum deflection of the control surfaces.

These and other objects of the present invention are achieved by providing improved linkage structure which includes a radial fork member pivotally coupled to the wing or stabilizers and responsive to a linear actuator for pivoting a control surface mounted on the wing or stabilizer. The radial fork is coupled to a push rod which is in turn coupled to the control surface to thereby deflect the control surface in response to displacement of the radial fork.

In a particularly desirable embodiment of the invention, the linkage structure is used in combination with a control surface having a forward airflow end and an aft airflow end. The forward airflow end is arcuately shaped to define a linkage compartment interior of the control surface. The skin member of the forward end includes an aperture through which the radial fork extends. The skin member is further constructed to maintain substantial continuity between the wing or stabilizer and the control surface skin during maximum deflection of the control surface.

Further apparatus which is considered to be invention is particularly pointed out and distinctly claimed in the numbered paragraphs appended hereto. The invention, however, both as to organization and method of practice, may best be understood by a reading of the following detailed description, taken in conjunction with the drawings.

BEST MODE FOR CARRYING OUT THE INVENTION

Figure 1:
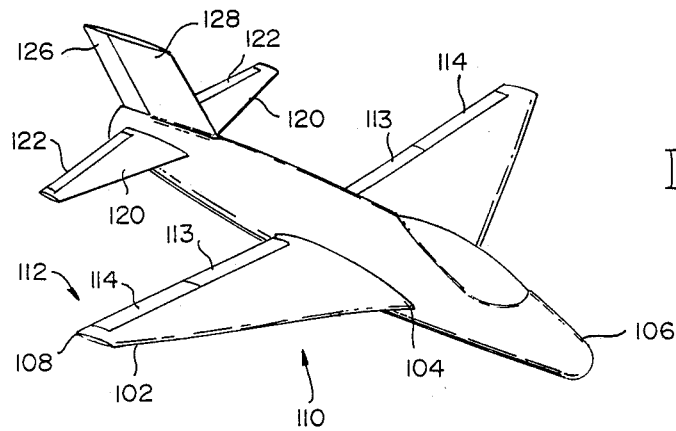
FIG. 1 is an isometric view of a fighter airplane for which the subject invention is particularly suited.

A fighter airplane 100 for which the subject invention is particularly well-suited is illustrated in FIG. 1. The airplane includes a wing 102 having a first attaching end 104 which is rigidly attached to the fuselage 106 of the airplane 100. The wing 102 also includes a second free end 108 which is opposite and remote from the attaching end 104.

As is known, each wing 102 includes a leading edge 110 and a trailing edge 112. The trailing edge 112 has mounted thereto a flap 113 and an aileron 114. As is also known in the art, the ailerons 114 are deflected upwardly and downwardly in an asymmetrical manner to roll the aircraft. The flaps 113 are deflected downwardly in a symmetrical manner to decrease the stall speed and increase the drag of the airplane 100.

The airplane 100 also includes a horizontal stabilizer 120 having an elevator 122 pivotally mounted on its trailing edge. The elevator 122 is deflected upwardly or downwardly in a symmetrical manner to pitch the airplane either downwardly or upwardly, respectively. Finally, a rudder 126 is pivotally mounted on the trailing edge of a vertical stabilizer 128. The rudder 126 is deflected in opposite directions to yaw the airplane 100 to the right or left.

The flaps 113, ailerons 114, elevator 122 and rudder 126, as well as other components such as flaperons (not shown) and spoilers (not shown), are referred to herein as "control surfaces." Thus, although the inventive linkage mechanism is described with reference to an aileron, it will be understood that it is applicable to all control surfaces. In a similar manner, the wing 102 and vertical stabilizer 128, as well as components such as horizontal stabilizers, are referred to collectively herein as "airfoils."

Figure 3:
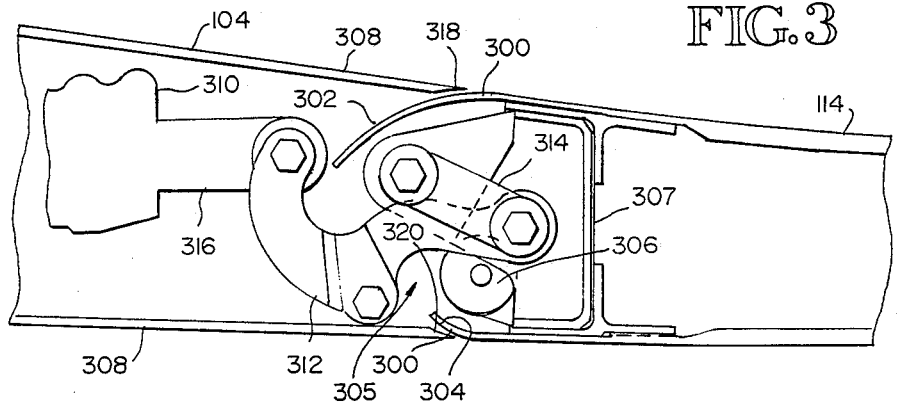
FIG. 3 is a partial section view of a wing and aileron combination including the linkage mechanism which is the subject of the present invention.

With reference to FIG. 3, a sectional view of the wing 102 and the aileron 114 of the subject invention is provided. The aileron 114 includes a skin member 300 having first and second inwardly projecting portions 302 and 304, respectively. The inwardly projecting portions 302 and 304 cooperate with a support beam 307 to define a linkage compartment 305. The aileron 114 includes a pivotal coupling 306 which pivotally couples the aileron 114 to the wing 104. The wing 104 also includes a skin member 308 adapted to be in substantially constant contact with the skin member 300 of the aileron 114.

The skin member 308 of the wing 104 includes first and second flexible portions 318 and 320, respectively, mounted to the aft airflow end 112 thereof and adapted to be in substantially constant contact with the skin member 300 of the aileron 114. The inwardly projecting portions 302 and 304 of the aileron 114 cooperate with the flexible portions 318 and 320 to maintain a substantially continuous outer shell for the wing 104 and aileron 114, thereby reducing losses due to drag and reducing the visibility of the airplane 100 to radar.

The linkage mechanism of the subject invention includes a linear actuator 310, a radial fork 312 and a linear push rod 314. The linear actuator 310 includes an actuator arm 316 which moves in a linear direction in response to a linear drive force provided by the actuator 310. The linear actuator 310 is further responsive to an input provided by the operator of the aircraft, as is known in the art. The linear actuator 310 and actuator arm 316 may comprise any of a number of commercial devices.

Figure 2:
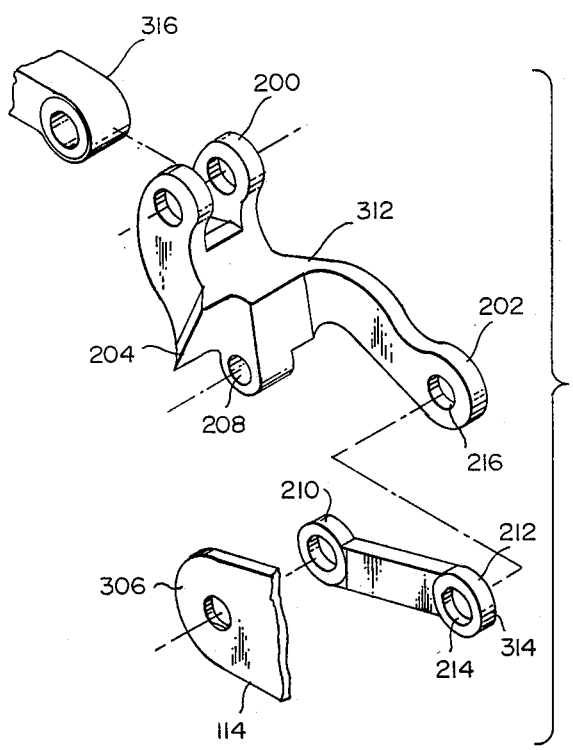
FIG. 2 is an exploded partial isometric view of the linkage mechanism which comprises the subject invention.
Figure 4:
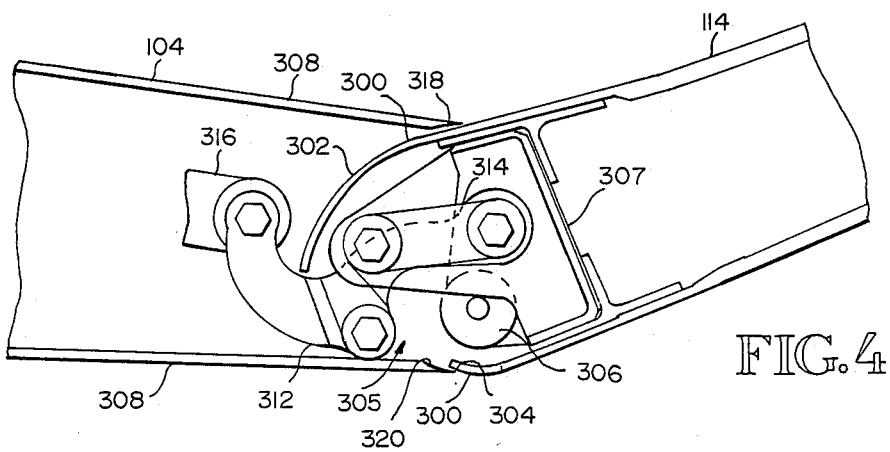
FIG. 4 is a sectional view illustrating the linkage mechanism of the subject invention in operation to deflect an aileron upward.
Figure 5:
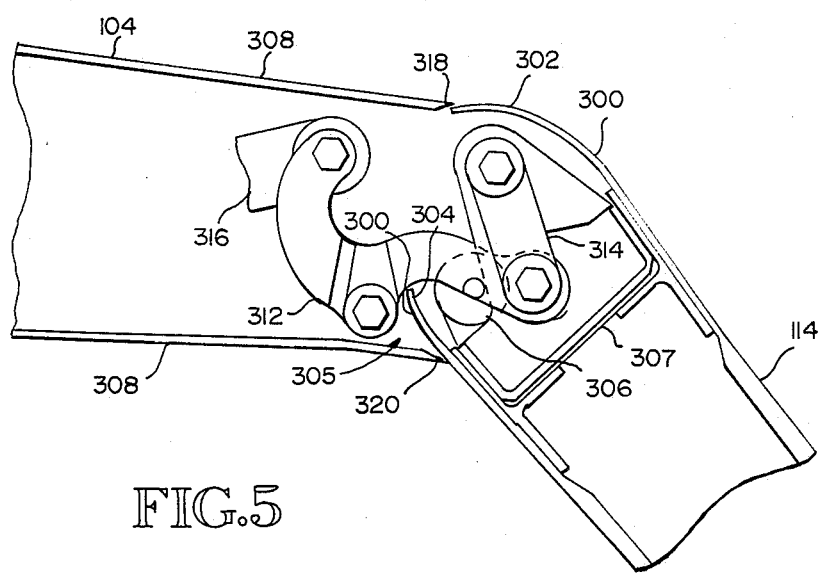
FIG. 5 is a sectional view illustrating the linkage mechanism which is the subject of the present invention in operation to deflect an aileron downward.

With reference to FIG. 2, a more detailed description of the linkage mechanism will be provided. The radial fork 312 includes a first arm 200, a second arm 202 and an intermediate portion 204. The intermediate portion 204 is coupled intermediate the first arm 200 and the second arm 202. The first arm 200 is arcuately configured, as illustrated in FIGS. 3–5, to allow free movement of the first inwardly projecting portion 302 of the skin member 300. In similar manner, the second arm 202 is arcuately configured to allow free movement of the second inwardly projecting portion 304 of the skin member 300 (see FIG. 5).

In accordance with the present invention, the inwardly projecting portions 302 and 304 are constructed to maintain substantial continuity with the skin member 308 of the wing 104 for all angular deflections of the aileron 114. Since the expected downward deflection of the aileron 114 is greater than the expected upward deflection, the first inwardly projecting portion 302 is longer than the second inwardly projecting portion 304. In a similar manner, the curvature of the first arm 200 of the radial fork 312 is greater than the curvature of the second arm 202.

The first arm 200 further includes a clevis joint 206 adapted to be pivotally coupled to the actuator arm 316. Similarly, the intermediate portion 204 includes a pivoting through-hole 208 for pivotally mounting the radial fork 312 to the wing 104. In the presently preferred embodiment of the invention, the through-hole 208 is adapted to be pivotally mounted to the wing 104 at a position which is toward the lower portion of the wing 104 and exterior of the linkage compartment 305. The positioning and configuration of the pivot through-hole 208 allows maximum deflection of the aileron 114 in both the upward and downward radial positions without interference from the radial fork 312, i.e., without the projecting portions 302 and 304 contacting the radial fork, as illustrated in FIGS. 4 and 5. Further, since a substantial portion of the radial fork 312 is mounted exterior of the aileron 114, the linkage compartment 305 may be reduced in size, providing a thin aileron 114, thereby allowing greater maneuverability of the airplane 100.

The push rod 314 comprises an elongate linkage member pivotally interposed between the radial fork 312 and the aileron 114 for magnifying the distance of travel of the second arm 202 to thereby magnify the deflection of the aileron 114 for a given displacement of the arm 202. In the presently preferred embodiment of the invention, the radial fork 312 responds to linear travel of approximately 25 centimeters to provide arcuate displacement of approximately 15 centimeters to the second arm 202. The push rod 314 magnifies this displacement to provide a maximum of approximately 40 degrees downward deflection (FIG. 5) and approximately 20 degrees upward deflection of the aileron 114.

The push rod 314 includes a first end 210 which is adapted to be pivotally coupled to the thin aileron 114 at the aileron pivotal coupling 306. The push rod also includes a second end 222 which is adapted to be pivotally coupled to the second arm 202 via matching through-holes 214 and 216, respectively.

As mentioned hereinabove, the linkage mechanism of the subject invention is particularly well-suited for the fighter airplane 100 wherein the wings 104 stabilizers and control surfaces are exceptionally thin. In the presently preferred embodiment of the invention, the thickness of the wing 102 (i.e., the height of the support beam 307) at the aft airflow end 112 is approximately 20 centimeters.

Due to the desired length of the first and second inwardly projecting portions 302 and 304, respectively, of the aileron 114, minimal access is allowed to the linkage compartment 305. Accordingly, the radial fork 312 is preferably mounted to the wing exterior of the linkage compartment 305, as described hereinabove.

Although the present invention has been described herein by reference to the preferred embodiments illustrated in FIGS. 1-5, many modifications and variations therein will readily become apparent to those skilled in the art without departing from the true scope and spirit of the present invention. It is the intention of the inventor, by the appended claims, to embody all such modifications and variations as fall within the true scope and spirit of the present invention.

I claim:

1. An improved linkage for positioning a control surface pivotally mounted to an airfoil of an aircraft wherein the control surface has a linkage compartment at a forward end thereof, the linkage compartment having a substantially curvilinear outer shell portion that extends inwardly of the airfoil on the top and bottom thereof, the linkage for pivoting the control surface such that at least a portion of the outer shell of the linkage compartment is interior of the outer shell of the airfoil for all angular displacements, said linkage comprising:

actuator means coupled to the airfoil for providing a drive force to pivot the control surface; and linkage means responsive to the drive force provided by said actuator means for positioning the control surface, said linkage means being pivotally coupled to the airfoil at a first pivot point and to said actuator means at a second pivot point spaced from said first pivot point, said linkage means being shaped to extend interior of the linkage compartment and being pivotally coupled to the control surface at a third pivot point spaced from said first and second pivot points to pivot the control surface in response to the drive force provided by said actuator means.

2. The linkage as recited in claim 1 wherein said linkage means is shaped to allow free movement of the outer shell of said control surface.

3. The linkage as recited in claim 2 wherein said linkage comprises:

a first linkage member pivotally coupled to the airfoil and to said actuator; and a second linkage member pivotally coupled to said first linkage member and to the control surface interior of the linkage compartment at a location offset from the pivotal mounting of said control surface on said airfoil, said first linkage member being shaped to extend interior of said linkage compartment to pivotally engage said linkage member and being responsive to the drive force of said actuator means to displace said second linkage member to thereby pivot and position said airfoil.

4. The linkage as recited in claim 3 wherein said first linkage member comprises a radial fork having a first arm, a second arm and an intermediate portion intermediate said first and second arms, said intermediate portion being pivotally coupled to the airfoil, said first arm being coupled to said actuator means such that said radial fork is pivoted in response to the drive force of said actuator means, said second arm extending interior the linkage compartment of the control surface and engaging said second linkage member.

5. The linkage as recited in claim 4 wherein said second linkage member comprises a push rod having a first end pivotally coupled to the control surface and a second end pivotally coupled to said second arm of said radial fork such that the control surface is radially deflected in response to the drive force of said actuator means.

6. The linkage as recited in claim 5 wherein said first arm of said radial fork is arcuately configured to allow free movement of the outer shell of the control surface.

7. The linkage as recited in claim 6 wherein said second arm is arcuately configured to allow free movement of the outer shell of the control surface.

8. The linkage as recited in claim 7 wherein said actuator means comprises a linear actuator pivotally coupled to the airfoil, said linear actuator having an actuator arm and being responsive to input from the aircraft operator to displace said actuator arm in first and second directions, thereby to provide the drive force.

9. The linkage as recited in claim 4 wherein said second linkage member comprises a coupling member for coupling said first linkage member to the control surface.

10. An improved linkage for positioning the control surface of an aircraft airfoil wherein the control surface includes a linkage compartment at a forward end thereof, the control surface being pivotally coupled to the airfoil, the linkage compartment having a substantially curvilinear outer shell portion which extends inwardly of the outer shell of the airfoil on the top and bottom thereof, the linkage for pivoting the control surface such that at least a portion of the outer shell of the linkage compartment is interior of the outer shell of the airfoil for all angular displacements, said linkage comprising:

a linear actuator pivotally coupled to the airfoil of the aircraft, said linear actuator having an actuator arm and being responsive to input from the aircraft operator to displace said actuator arm in first and second directions;

a radial fork having a first arm, a second arm and an intermediate portion intermediate said first and second arms, said intermediate portion being pivotally coupled to the airfoil exterior of the linkage compartment, said first arm being pivotally coupled to said linear actuator such that said radial fork is pivoted in response to displacement of said actuator arm, said second arm extending interior the linkage compartment; and a push rod having a first end pivotally coupled to the control surface and a second end pivotally coupled to said second arm of said radial fork such that the control surface is radially deflected in response to the linear displacement of said actuator arm.

11. The linkage as recited in claim 10 wherein said first arm of said radial fork is arcuately configured to allow free movement of the outer shell of the control surface.

12. The linkage as recited in claim 11 wherein said second arm is arcuately configured to allow free movement of the outer shell of the control surface.

13. The linkage as recited in claim 12 wherein the ratio of the distance from the pivotal coupling of said intermediate portion to the pivotal coupling of said first arm to the distance from the pivotal coupling of said intermediate portion to the pivotal coupling of said second arm is substantially one to one.

14. An improved linkage for positioning a control surface pivotally mounted on an airfoil of an aircraft wherein the control surface has a linkage compartment at a forward end thereof, the linkage compartment having a substantially curvilinear outer shell portion which extends inwardly of the outer shell of the airfoil on the top and bottom thereof, the linkage for pivoting the control surface such that at least a portion of the outer shell of the linkage compartment is interior of the outer shell of the airfoil for all angular displacements, said linkage comprising:
- a linear actuator pivotally coupled to the airfoil, said actuator including an actuator arm and being responsive to input provided by the operator of the aircraft for displacing the actuator arm;
- a radial fork having a first arm, a second arm and an intermediate portion intermediate said first and second arms, said intermediate portion being pivotally coupled to the airfoil, the pivotal coupling being positioned toward the bottom of the airfoil and displaced from the outer shell of the linkage compartment such that said second arm extends into the interior of the linkage compartment, said first arm being pivotally coupled to said actuator arm such that linear displacement of said actuator arm results in rotation of said radial fork about the pivotal coupling of said intermediate portion, said first arm having a curvilinear configuration to allow free travel of the outer shell of the linkage compartment; and
- a substantially linear push rod having a first end pivotally coupled to the control surface and a second end pivotally coupled to said second arm of said radial fork, said push rod deflecting said control surface responsive to rotation of said radial fork.

15. The improved linkage as recited in claim 14 wherein the ratio of the distance between the pivotal connection of said first arm and said second arm of said radial fork is substantially one to one.

16. An improved airfoil for aircraft, comprising:
- a primary airflow member;
- actuator means for providing a drive force;
- a control surface having a skin member shaped to define a forward end and an aft end, said skin member of said forward end being arcuately shaped to define a linkage compartment interior of said flap, said skin member of said forward end having an aperture therethrough which provides limited access to said linkage compartment, said control surface being pivotally coupled to said primary airflow member;
- linkage means for positioning said control surface relative to said primary airflow member, said linkage means being pivotally coupled to said primary airflow member, said linkage means being shaped to extend interior said aperture and being pivotally coupled to said control surface, said linkage means being responsive to the drive force of said actuator means to arcuately displace said control surface to thereby position said control surface.

17. The airfoil as recited in claim 16 wherein said linkage means is shaped to allow free movement of said skin member of said control surface.

18. The airfoil as recited in claim 17 wherein said linkage means comprises:
- a first linkage member pivotally coupled to said primary airflow member; and
- a second linkage member pivotally coupled to said control surface interior said linkage compartment, said first linkage member being shaped to extend interior said linkage compartment through said aperture to engage said second linkage member and being responsive to the drive force of said actuator means to displace said second linkage member to thereby position said control surface.

19. The airfoil as recited in claim 18 wherein said first linkage member comprises a radial fork having a first arm, a second arm and an intermediate portion intermediate said first and second arms, said intermediate portion being pivotally coupled to said primary airflow member, said first arm being coupled to said actuator means such that said radial fork is pivoted in response to the drive force of said actuator means, said second arm extending interior the linkage compartment of said control surface and engaging said second linkage member.

20. The airfoil as recited in claim 19 wherein said second linkage member comprises a push rod having a first end pivotally coupled to said control surface and a second end pivotally coupled to said second arm of said radial fork such that said control surface is radially deflected in response to the drive force of said actuator means.

21. The airfoil as recited in claim 20 wherein said first arm of said radial fork is arcuately configured to allow free movement of said skin member.

22. The airfoil as recited in claim 21 wherein said second arm is arcuately configured to allow free movement of said skin member.

23. The airfoil as recited in claim 21 wherein said actuator means comprises a linear actuator pivotally coupled to said primary airflow member, said linear actuator having an actuator arm and being responsive to input from the aircraft operator to displace said actuator arm in first and second directions, thereby to provide the drive force.

24. An improved airfoil for aircraft, comprising:
- a wing member having a first side for attaching to the aircraft and having forward and aft airflow ends, said wing member further including a wing compartment interior said wing member adjacent said aft airflow end of said wing member;
- actuator means for providing a drive force, said actuator means being pivotally mounted interior said wing compartment and having an actuator arm which is displaced in response to said drive force;
- a flap having a skin member shaped to define a forward flap end and an aft flap end, said skin member of said forward flap end being arcuately shaped to define a linkage compartment interior of said flap, said skin member of said forward end having an aperture therethrough which provides limited access to said linkage compartment, said flap being pivotally coupled to said wing member;
- linkage means for positioning said flap relative to said wing member, said linkage means including a first linkage member pivotally coupled to said wing member interior of said wing compartment and a second linkage member pivotally coupled to said flap interior said linkage compartment, said first linkage member being shaped to extend interior said linkage compartment through said aperture to engage said second linkage member and being responsive to the displacement of said actuator arm to displace said second linkage member to thereby pivotally position said flap.

25. The airfoil as recited in claim 24 wherein said first linkage member comprises a radial fork having a first arm, a second arm and an intermediate portion intermediate said first and second arms, said intermediate portion being pivotally coupled to said wing member interior of said wing compartment, said first arm being pivotally coupled to said actuator arm such that said radial fork is pivoted in response to displacement of said actuator arm, said second arm extending interior the linkage compartment of said flap and engaging said second linkage member.

26. The airfoil as recited in claim 25 wherein said second linkage member comprises a push rod having a first end pivotally coupled to said flap and a second end pivotally coupled to said second arm of said radial fork such that said flap is radially deflected in response to the linear displacement of said actuator arm.

27. The airfoil as recited in claim 26 wherein said first arm of said radial fork is arcuately configured to allow free movement of said skin member.

28. The airfoil as recited in claim 27 wherein said second arm is arcuately configured to allow free movement of said skin member.

29. An improved airfoil for aircraft, comprising:
a primary airflow member having a first side for attaching to the aircraft and having forward and aft airflow ends, said primary airflow member further including a primary member compartment interior said primary airflow member adjacent said aft airflow end;
a linear actuator pivotally mounted interior of said primary member compartment, said linear actuator having an actuator arm and being responsive to input from the aircraft operator to displace said actuator arm in first and second directions;
a control surface having a forward control end and an aft control end, said forward control end having a skin member which extends arcuately from the top and bottom thereof to define a linkage compartment, said skin member having an opening therethrough which provides limited access to said linkage compartment, said control surface being pivotally coupled to said primary airflow member;
a radial fork having a first arm, a second arm and an intermediate portion intermediate said first and second arms, said intermediate portion being pivotally coupled to said primary airflow member interior of said primary member compartment, said first arm being pivotally coupled to said linear actuator such that said radial fork is pivoted in response to displacement of said actuator arm, said second arm extending interior said linkage compartment of said control surface; and
a push rod having a first end pivotally coupled to said control surface and a second end pivotally coupled to said second arm of said radial fork such that said control surface is radially deflected in response to the linear displacement of said actuator arm.

30. The airfoil as recited in claim 29 wherein said first arm of said radial fork is arcuately configured to allow free movement of the top portion of said skin member.

31. The airfoil as recited in claim 30 wherein said second arm is arcuately configured to allow free movement of the bottom portion of said skin member.

32. The airfoil as recited in claim 31 wherein the ratio of the distance from the pivotal coupling of said intermediate portion to the pivotal coupling of said first arm to the distance from the pivotal coupling of said intermediate portion to the pivotal coupling of said second arm is substantially one to one.

* * * * *